United States Patent
Liu et al.

(10) Patent No.: US 12,525,684 B2
(45) Date of Patent: Jan. 13, 2026

(54) RESISTIVE POLYMER MEMBRANES FOR ENERGY STORAGE DEVICES

(71) Applicant: THE REGENTS OF THE UNIVERSITY OF CALIFORNIA, Oakland, CA (US)

(72) Inventors: Ping Liu, San Diego, CA (US); Matthew Gonzalez, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1317 days.

(21) Appl. No.: 17/282,167

(22) PCT Filed: Oct. 3, 2019

(86) PCT No.: PCT/US2019/054592
§ 371 (c)(1),
(2) Date: Apr. 1, 2021

(87) PCT Pub. No.: WO2020/072838
PCT Pub. Date: Apr. 9, 2020

(65) Prior Publication Data
US 2022/0013860 A1     Jan. 13, 2022

Related U.S. Application Data

(60) Provisional application No. 62/740,930, filed on Oct. 3, 2018.

(51) Int. Cl.
*H01M 50/403*     (2021.01)
*H01M 10/0565*   (2010.01)
(Continued)

(52) U.S. Cl.
CPC ..... *H01M 50/431* (2021.01); *H01M 10/0565* (2013.01); *H01M 50/403* (2021.01);
(Continued)

(58) Field of Classification Search
None
See application file for complete search history.

(56) References Cited

U.S. PATENT DOCUMENTS

2006/0286456 A1    12/2006   Fu et al.
2009/0155678 A1    6/2009    Less et al.
(Continued)

FOREIGN PATENT DOCUMENTS

CN    102224616 A    10/2011
CN    103000956 A    3/2013
(Continued)

OTHER PUBLICATIONS

Tung et al., Low-Temperature Solution Processing of Graphene-Cabron Nanotube Hybrid Materials for High-Performance Transparent Conductors, 2009, American Chemical Society, vol. 9, Issue 5, p. 1949-1955 (Year: 2009).*
(Continued)

*Primary Examiner* — Ula C Ruddock
*Assistant Examiner* — Maria F Orozco
(74) *Attorney, Agent, or Firm* — Sheppard, Mullin, Richter & Hampton LLP

(57) ABSTRACT

Systems and methods are disclosed for a battery that includes an anode, a separator between the anode and the cathode, a cathode, and a membrane coupled to the separator having a mixed electronic conductor and ionic conductor. A method may include casting a membrane onto a surface, dispersing carbon nanotubes in acetone to form a dispersion, adding a powder and dibutyl phthalate to the dispersion to form a polymer, and mixing the polymer. Another method
(Continued)

Figure 1. Schematic of the simple resistor mechanism to prevent high current self-discharge when internal shorting occurs in a battery. When dendrite short circuits the cathode to the anode, normally the cell rapidly discharges across the short, generating a large amount of heat and cell ignition as represented in 1a). The additional resistance imposed by the resistive membrane added in 1b) reduces the $I_{SC}$ and prevents catastrophic failure while allowing continues battery function even after shorting may include casting a sheet of a composite, removing the sheet, and rinsing the sheet. Another method may further include casting a film, evaporating to form a dry film, and casting a mixture onto the dry film to form a bilayer membrane. Another method may further include casting a cathode, casting a CNT mixture onto the cathode, evaporating the cathode, and rinsing the cathode in ether.

18 Claims, 16 Drawing Sheets

(51) Int. Cl.
  *H01M 50/426* (2021.01)
  *H01M 50/431* (2021.01)
  *H01M 50/437* (2021.01)
  *H01M 50/457* (2021.01)
  *H01M 50/489* (2021.01)

(52) U.S. Cl.
  CPC ....... *H01M 50/426* (2021.01); *H01M 50/437* (2021.01); *H01M 50/457* (2021.01); *H01M 50/489* (2021.01); *H01M 2300/0082* (2013.01)

(56) References Cited

U.S. PATENT DOCUMENTS

| | | | |
|---|---|---|---|
| 2009/0246625 A1 | 10/2009 | Lu | |
| 2013/0224632 A1 | 8/2013 | Roumi | |
| 2016/0087321 A1 | 3/2016 | Wohrle et al. | |
| 2016/0233472 A1* | 8/2016 | Modeki | H01M 50/124 |
| 2017/0084953 A1 | 3/2017 | Smith et al. | |
| 2017/0093001 A1 | 3/2017 | Kim et al. | |
| 2017/0271724 A1 | 9/2017 | Schmidt et al. | |
| 2018/0254463 A1* | 9/2018 | Sundaresan | H01M 10/486 |
| 2018/0269453 A1* | 9/2018 | Cho | H01M 50/449 |
| 2021/0288381 A1* | 9/2021 | Hu | H01M 50/454 |

FOREIGN PATENT DOCUMENTS

| | | |
|---|---|---|
| CN | 105074961 A | 11/2015 |
| CN | 105659410 A | 6/2016 |
| JP | 2003503822 A | 12/2003 |
| KR | 2017/0108496 | 9/2017 |
| WO | WO 2016/161920 A1 | 10/2016 |
| WO | WO 2016/165559 A1 | 10/2016 |
| WO | WO-2018040904 A1 * | 3/2018 .......... H01M 50/454 |

OTHER PUBLICATIONS

First Office Action issued Oct. 25, 2022 for Chinese Application No. 201980071243.5.

Foroughi et al., "Effect of post-spinning on the electrical and electrochemical properties of wet spun graphene fibre," RSC Advances (2016), 6 (S2), 46427-46432, 11 pages.

Kang et al., "All-solid-state flexible supercapacitors based on papers coated with carbon nanotubes and ionic-liquid-based gel electrolytes," Nanotechnology, Jan. 17, 2012, vol. 23, No. 6, 3 pages.

Le et al., "Composite Gel Polymer Electrolyte Based on Poly(vinylidene flouride-hexafluoropropylene) (PVDF-HFP) with Modified Aluminum-Doped Lithium Lanthanum Titanate (A-LLTO) for High-Performance Lithium Rechargable Batteries," ACS Appl. Mater. Interfaces, Jul. 27, 2016, vol. 6, No. 32, pp. 20701-20719, S-1-12, 22 pages.

Thangadurai et al., "Recent progress in solid oxide and lithium ion conducting electrolytes research," Ionics, 2006, vol. 12, 5 pages.

International Search Report and Written Opinion mailed Jan. 30, 2020 for International Application No. PCT/US2019/054592, filed Oct. 3, 2019.

\* cited by examiner

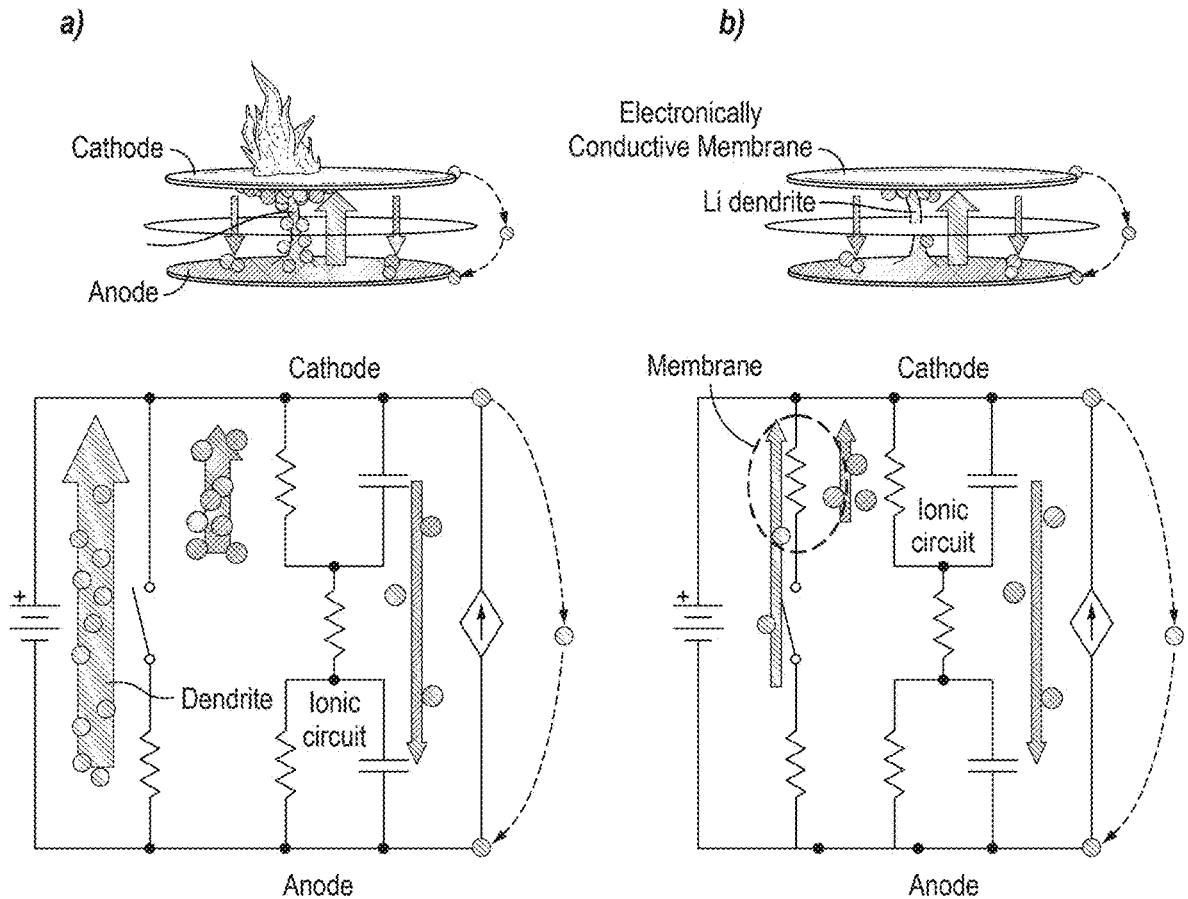

Figure 1. Schematic of the simple resistor mechanism to prevent high current self-discharge when internal shorting occurs in a battery. When dendrite short circuits the cathode to the anode, normally the cell rapidly discharges across the short, generating a large amount of heat and cell ignition as represented in 1a). The additional resistance imposed by the resistive membrane added in 1b) reduces the $I_{SC}$ and prevents catastrophic failure while allowing continues battery function even after shorting

FIG. 1

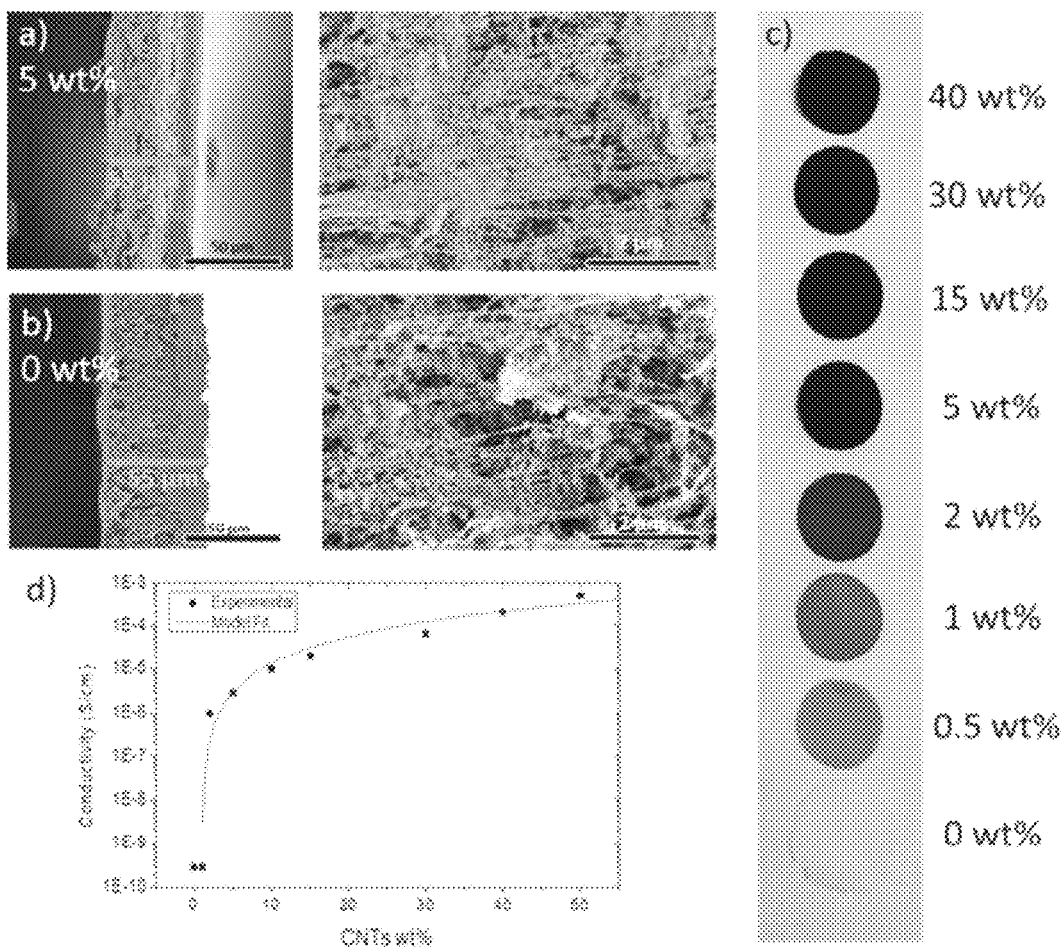

Figure 2. a & b) SEM images of the cross section of the 5 wt% and 0 wt% PVDF-HFP:CNTs composite freestanding membranes. Higher magnification shows the porous structure of both membranes with slight morphology change with the addition of CNTs; however, this change does not manifest any noticeable change in the membranes' ability to conduction ions. Scale bars represent 50 μm and 2 μm. c) An optical photograph of membranes cut to coincell dimensions (diameter of 17 mm). The membranes remain mechanically robust even up to 40 wt% loadings and show a progressive darkening as CNTs content is increased. d) Experimental data and power law model fit of the conductivity of the membrane as a function of CNTs weight loading.

FIG. 2

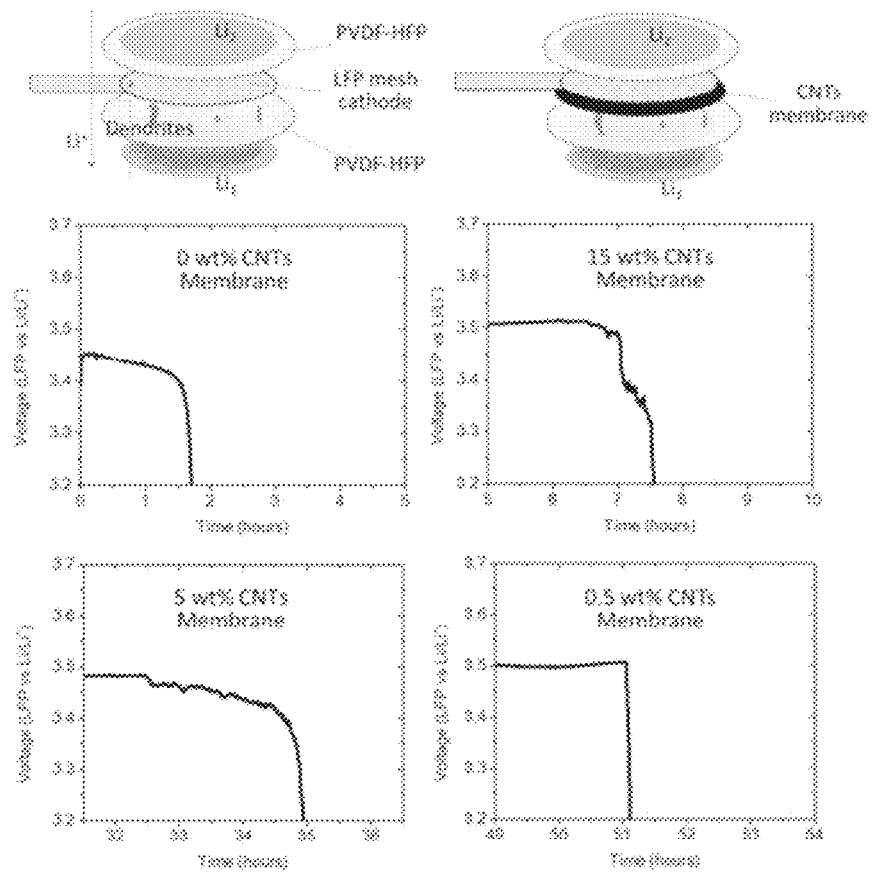

Figure 3. Open circuit potential of a LFP mesh cathode sandwiched between a Li||Li symmetric cell. Galvanostatic current (2 mA/cm$^2$) is driven across the Li||Li electrodes to deposit Li dendrites on the surface of $Li_x$, which grow to contact and short the cathode to the anode. The dramatic fall of the OCP in cells that have 0 wt% and 0.5 wt% membranes indicate a rapid self-discharge across the short. The flat discharge plateaus from the 15 wt% and 5 wt% cells indicate a much slower discharge from the short.

FIG. 3

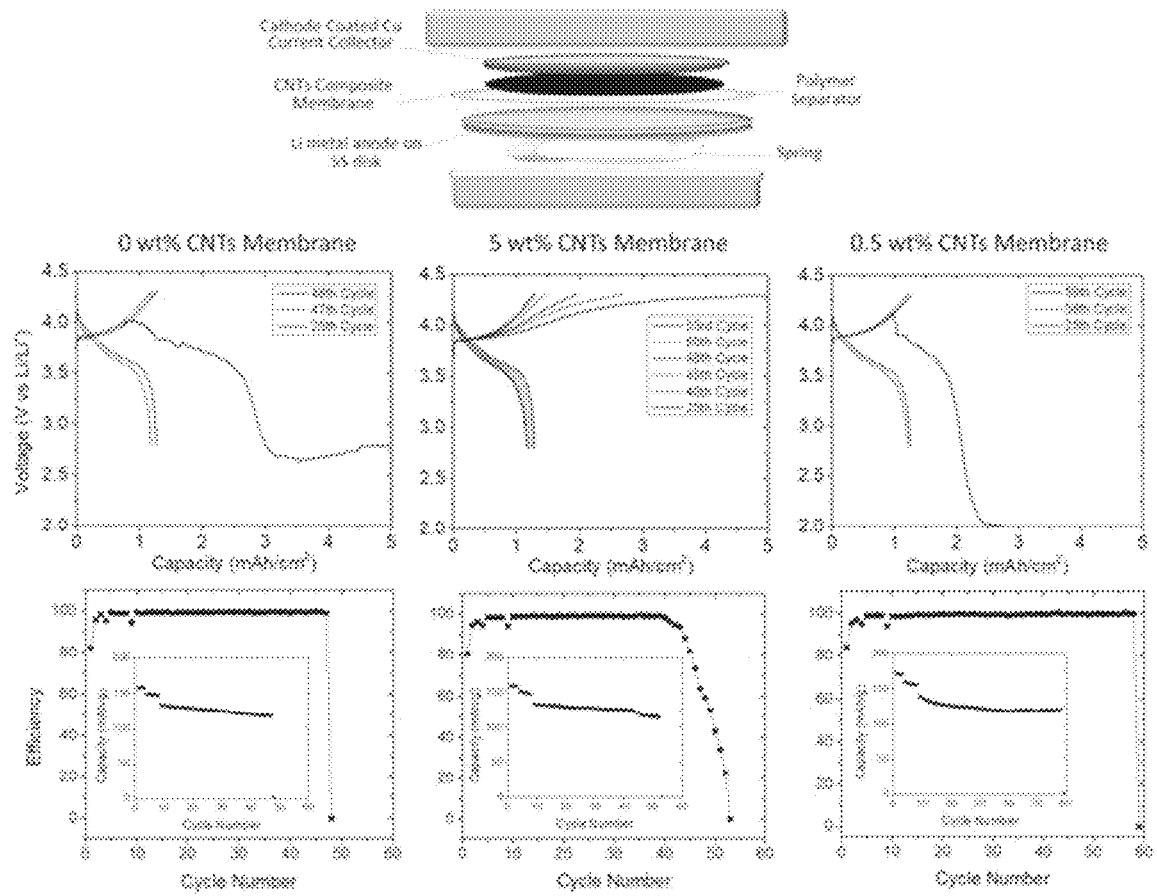

Figure 4. The membranes were tested in a NMC||Li coincell with galvanostatic charge/discharge. The voltage profiles show clear drops in cell potential during the final charge of both the 0 wt% and 0.5 wt% indicating rapid self-discharge from an internal short circuit. The 5 wt% membrane shows a gradual increase in charge capacity due to simultaneous slow self-discharge across the composite membrane and dendrite circuit. Monitoring the efficiency and the capacity of the cells can provide early detection of a shorting incident by a battery management system while still allowing use of the battery.

FIG. 4

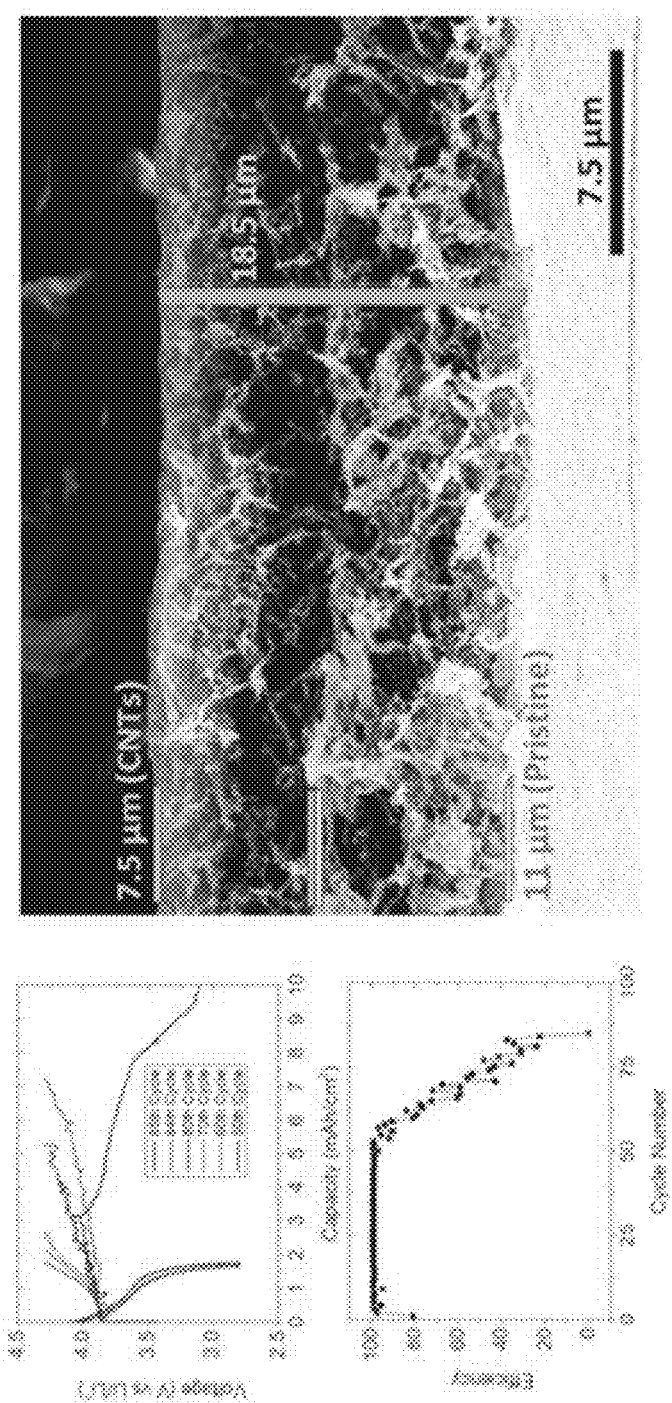

Figure 5. Cell shorting of a bilayer membrane comprised of 0 wt% and 3 wt% PVDF-HFP:CNTs in a NCM||Li coincell. The 3 wt% mixture was directly casted on a 0 wt% membrane to create a thin membrane with a 11 μm 0 wt% layer and a 7.5 μm 3 wt% layer. The membranes were tested identically to the freestanding membranes with a current of 2 mA/cm² and show very similar results of a slowed self-discharge upon internal shorting.

FIG. 5

Figure 6. SEM images of a ~100 μm thick NMC cathode with a <10 μm thick coating of 3wt% PVDF-HFP:CNTs composite.

RESISTIVE POLYMER MEMBRANES FOR ENERGY STORAGE DEVICES

CROSS-REFERENCE

The present application is a U.S. national phase of PCT International Patent Application No. PCT/US2019/054592, filed Oct. 3, 2019 and titled "RESISTIVE POLYMER MEMBRANES FOR ENERGY STORAGE DEVICES", which claims priority to U.S. Provisional Patent Application No. 62/740,930, filed Oct. 3, 2018 and titled "RESISTIVE POLYMER MEMBRANES FOR ENERGY STORAGE DEVICES," which is incorporated herein by reference in its entirety.

TECHNICAL FIELD

The present disclosure is generally related to energy storage devices. In particular, embodiments of the present disclosure relate to a membrane used in energy storage devices to reduce internal shorting and device failure.

BRIEF SUMMARY

Embodiments of the disclosure are directed to a battery that may have a battery capacity. The battery may include an anode. The battery may also include a separator between the anode and the cathode. The battery may further include a cathode. The battery may further include a membrane coupled to the separator. The membrane may include a mixed electronic conductor and ionic conductor with an electronic resistance.

In embodiments, the electronic resistance may be between about 10 ohms cm$^2$ to 1 megaohm cm$^2$.

In embodiments, the mixed electronic conductor and ionic conductor may be implemented as one of a single material that has both electrically conductive and ionically conductive properties, a solid material based on a mixture of two or more ingredients, and a porous structure comprising a liquid.

In embodiments, the mixed electronic conductor and ionic conductor may include one or more of carbon nanotubes, carbon blacks, carbon fiber, graphite particles, electrically conductive metals, polymers, and porous polymer gel electrolytes.

In embodiments, the membrane may be implemented as one or more of a free-standing membrane, a bilayer separator, a coating on an insulating separator, and a direct coating on the cathode.

In embodiments, the membrane may include a nonconductive layer and a partially electrically conductive layer.

In embodiments, the anode may include one or more of graphite, silicon, Li-metal, Na-metal, and Zn-metal.

In embodiments, the membrane may include one or more of a carbon nanotube and a porous polymer gel electrolyte.

In embodiments, the cathode may include one or more of Li-rich layered oxides, high-Ni layered oxides, sulfur, and oxygen.

In embodiments, the battery may be implemented using one or more of the following systems: an aqueous and organic electrolyte system and a Li-ion, Na-ion, Mn-ion, Zn-ion, and Li-Sulfur system.

In embodiments, the battery may be implemented using one or more of the following components: a Carbon, Silicon, and pure-metal anode and a Lithium Iron Phosphate (LPF), Lithium Cobalt Oxide (LCO), Nickel Manganese Cobalt (NMC), Lithium Nickel Cobalt Aluminum Oxide (NCA), and Lithium Manganese Spinel (LMO) cathode.

In embodiments, the battery may further include a porous polymer and conductive filler composite.

In embodiments, the porous polymer and conductive filler composite may include one or more of polyvinylidene fluoride (PVDF), poly(vinylidene fluoride-co-hexafluoropropylene) (PVDF-HFP), polyethylene (PE), and polypropylene (PP) and one or more of a carbon-based, metallic, and semi-conducting filler.

In embodiments, the membrane may include a composite polymer-gel electrolyte membrane. The composite polymer-gel electrolyte membrane may include a PVDF-HFP copolymer, fumed silica (SiO2), and multi-walled carbon nanotubes (CNTs).

In another embodiment, a method is disclosed that may include casting a membrane onto a surface. The method may also include dispersing carbon nanotubes in acetone via ultra-sonication to form a dispersion. The method may further include adding a powder and dibutyl phthalate to the dispersion to form a polymer. The method may further include mixing the polymer until dissolved and the CNTs are incorporated into the membrane.

In embodiments, the casting may be implemented by phase inversion.

In embodiments, the dispersion may include acetone and carbon nanotubes.

In embodiments, the powder may include a 3:2 PVDF-HFP:SiO2 powder.

In embodiments, the method may further include disposing the membrane onto a separator between an anode and a cathode.

In another embodiment, a method is disclosed. The method may include casting a sheet of a composite onto a surface. The method may also include removing the sheet from the surface. The method may further include rinsing the sheet to extract DPB from pores of the sheet.

In embodiments, removing the sheet from the surface may be implemented by acetone evaporation.

In embodiments, the sheet may include carbon nanotubes.

In embodiments, the method may further include disposing the sheet onto a separator between an anode and a cathode thereby creating a battery.

In another embodiment, a method is disclosed that may include casting a film onto a surface. The method may also include evaporating the acetone from the film to form a dry film. The method may further include casting a mixture onto the dry film to merge the dry film and the mixture together to form a bilayer membrane.

In embodiments, the mixture may include CNTs and acetone.

In embodiments, the CNTs may be about three weight percent of the mixture.

In embodiments, the method may further include rinsing the bilayer membrane in ether to extract DBP.

In embodiments, the method may further include disposing the bilayer membrane onto a separator between an anode and a cathode thereby creating a battery.

In embodiments, the bilayer membrane may have a thickness of less than about 20 micrometers.

In embodiments, a CNT layer of the bilayer membrane may have a thickness of less than about 7.5 micrometers.

In embodiments, a second layer of the bilayer membrane may have a thickness of less than about 11 micrometers.

In another embodiment, a method is disclosed that may include casting a cathode onto aluminum foil. The method may also include casting a CNT mixture onto the cathode to form a coated cathode. The method may further include evaporating the acetone of the coated cathode. The method may further include rinsing the cathode in ether.

In embodiments, casting a cathode onto aluminum foil may be implemented using one or more of a ball milling and a blade coating method.

In embodiments, a method may include disposing a separator onto an anode. The method may also include disposing the cathode onto the separator.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 1 illustrates internal shorting within a battery when a Li metal dendrite penetrates the separator creating a low resistance contact between the cathode and the anode.

FIG. 2 illustrates the structure of the PVDF-HFP:CNTs membrane after DBP is extracted, in accordance with various embodiments of the present disclosure.

FIG. 3 illustrates an energy storage device configuration and testing, in accordance with various embodiments of the present disclosure.

FIG. 4 illustrates testing of free standing membranes, in accordance with various embodiments of the present disclosure.

FIG. 5 illustrates a bilayer separator coated directly on a fully insulting separator, in accordance with various embodiments of the present disclosure.

Figure 6:
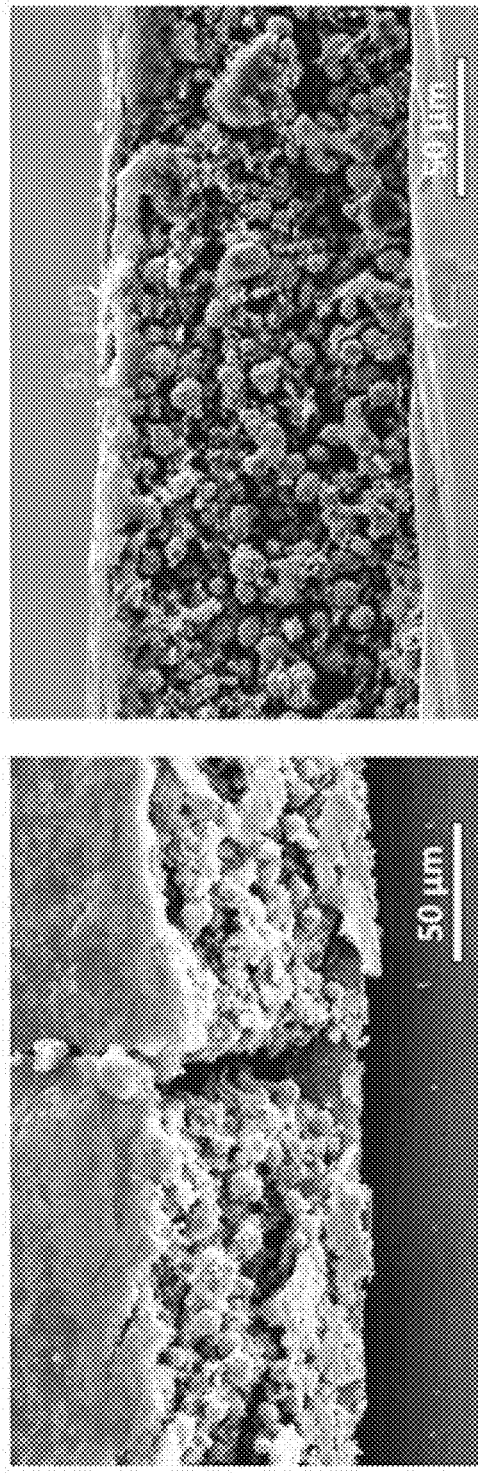
FIG. 6 illustrates a direct coating on the active cathode material, in accordance with various embodiments of the present disclosure.

The figures are not intended to be exhaustive or to limit the presently disclosed technology to the precise form disclosed. It should be understood that the presently disclosed technology can be practiced with modification and alteration, and that the presently disclosed technology be limited only by the claims and the equivalents thereof.

DETAILED DESCRIPTION

Dendritic growth inside a high capacity electrochemical system can initiate unwanted self-discharge and a very dangerous set of reactions that result in cell temperatures reaching greater than about 500° C. within seconds of internal shorting, which can cause catastrophic cell failure. Accordingly, existing cell components are often designed with shut-off features that engage after shorting occurs and cell temperatures begins to rise, but before a threshold temperature is reached (e.g., a runaway temperature). For example, some separators can be designed to collapse in response to high temperatures, blocking ion-flow and effectively shutting off the cell. However, this is an irreversible process and will not prevent thermal runaway if a critical temperature is reached before proper shutoff can occur. Additionally, this membrane will have little effect if the short circuit occurs from separator penetration by a metallic dendrite. Reversible thermo-responsive membranes have been developed, but share similar drawbacks during internal shorting and rapid self-discharge.

Other separators may attempt to mechanically suppress dendrites to prevent internal shorting from occurring in the first place. However, these fail to prevent shorting and often limit the performance of cells as well. Various other shut-off features have been designed, such as, for example, detecting dendrite penetration, adding sacrificial active material, and incorporating flame retardant and other additives, each having their own drawbacks.

Disclosed are materials, systems, methods, and articles of manufacture relating to an energy storage device including a membrane that can be used to detect and prevent internal shorting. The membrane, as may be used in, for example, a high capacity energy storage device, can improve safety by preventing self-discharge that may occur when metallic dendrites grow and penetrate the separator that normally prevents internal discharge. This can prevent the cell from reaching dangerous temperatures and thermal conditions during the short.

In embodiments, the presently disclosed technology discloses an energy storage device with an anode, a separator, a membrane, and a cathode. The anode may include one or more of graphite, silicon, Li-metal, Na-metal, Zn-metal, etc. The separator may be an insulating separator. It should be appreciated that other anodes and separators may be used with the disclosed membrane.

The membrane may include a mixed electronic conductor and ionic conductor with an electronic resistance. The mixed electronic conductor and ionic conductor may be implemented as one or more of a single material that has both electrically conductive and ionically conductive properties, as a solid material based on a mixture of two or more ingredients, and as a porous structure comprising a liquid. The components of the mixed electronic conductor and ionic conductor may include various carbon forms (e.g., carbon nanotubes, carbon blacks, carbon fiber, and graphite particles), any other electronically conductive material (e.g., other metals), polymers, and a porous polymer gel electrolyte. The electronic resistance of the mixed electronic conductor and ionic conductor may range from about 10 ohms/cm$^2$ to about 1 megaohm/cm$^2$.

The membrane may allow normal cell performance while introducing an electrically conductive pathway with a resistance to reduce rapid self-discharge and cell failure in the case of an internal short. In some embodiments, the membrane may be a thin freestanding membrane placed between an insulting separator and the cathode, a bilayer separator with a conductive side in contact with the cathode, or a thin film directly coated onto the cathode. It should be appreciated that the membrane may be implemented in various other ways in the energy storage device. In one example, the membrane may have a thickness of less than about 10 µm, contributing very little to the overall thickness of the cell.

The membrane may improve safety in high capacity energy storage devices by preventing the rapid self-discharge that may occur when metallic dendrites grow to penetrate the electronically resistive separator that normally prevents internal discharge. The membrane may result in a negligible increase in the impedance of the cell, allowing for unaltered battery operation during normal use. When internal shorting occurs (e.g. the growth of dendritic Li from the anode to the cathode), the conductive membrane may serve as an additional intermediate resistor in the short circuit, dramatically lowering the short circuit current and self-discharge rate of the cell. In high capacity cells this can prevent the large amount of heat often generated during a shorting incident which can result in thermal runaway and cell failure.

The resistive nature of the intermediate polymer membrane located between the dendrite and the active cathode material may reduce $I_{SC}$, preventing cell failure from the short circuit. When cell capacity is properly matched with membrane resistance, the $I_{SC}$ may gradually increase over a number of cycles, allowing for more time to detect an internal short circuit while simultaneously preventing a cell failure. This $I_{SC}$ can be detected by battery management systems (BMS) from the deviation in normal charge and discharge capacities (i.e. the battery efficiency), as described herein. The battery will slowly bleed charge capacity due to slow internal self-discharge but still remain functional for a number of cycles allowing continued use of the device until the battery can be properly replaced.

The membrane may be compatible with any electrochemical energy storage system that transports metal ions and deposits them in, or on, the anode during charge. These energy storage systems include aqueous and organic electrolyte systems; Li-ion, Na-ion, Mn-ion, Zn-ion, and Li-Sulfur systems; Carbon, Silicon, and pure-metal anodes; Lithium Iron Phosphate (LPF), Lithium Cobalt Oxide (LCO), Nickel Manganese Cobalt (NMC), Lithium Nickel Cobalt Aluminum Oxide (NCA), and Lithium Manganese Spinel (LMO) cathodes, and other energy storage systems.

The cathode may include one or more of Li-rich layered oxides, high-Ni layered oxides (e.g. $LiNi_{0.8}Co_{0.1}Mn_{0.1}O_2$), sulfur, oxygen, and other cathodes. In some embodiments, this may provide specific energies of greater than about 500 Wh/kg. It should be appreciated that other materials may be used for the cathode.

In some embodiments, the battery may also include a porous polymer and conductive filler composite including polyvinylidene fluoride (PVDF), poly(vinylidene fluoride-co-hexafluoropropylene) (PVDF-HFP), polyethylene (PE), polypropylene (PP) polymers with carbon-based, metallic, or semi-conducting fillers. It should be appreciated that other materials may be included in the battery.

In embodiments, the short circuit current $I_{SC}$ can be detected by a battery management system (BMS) circuit. By monitoring the bleed in charge/discharge capacity due to the gradual cell self-discharging across the membrane it is possible to detect the internal short circuit without a failure occurring. Cell efficiency—the ratio of charge capacity divided by discharge capacity—will gradually fall as measured charge capacity increases due to capacity bleed through internal discharge, and measure discharge capacity decreases due to additional self-discharge. A reduction in short circuit current may be detected in, for example, a "static" cathode setup and during active charging in a lithium ion cell. Internal shorting may be detected before complete cell failure. In embodiments, the cell may remain operational for several cycles after the detection.

FIG. 1 illustrates internal shorting within a battery when a Li metal dendrite penetrates the separator creating a low resistance contact between the cathode and the anode. As illustrated, when this occurs, a rapid self-discharge may produce a large current across the dendrite. This large current can generate a huge amount of heat in high capacity batteries that may result in dangerous thermal runaway and battery failure. By adding an electrically resistive membrane to intercept the dendrite, shorting-induced self-discharge occurs at a much slower rate. This reduces the $I_{SC}$ and the heat generated by the short, preventing cell failure. As described herein, the membrane can be implemented as a free-standing membrane, a coating on an insulating separator, or a direct coating on the cathode.

The membrane may only provide negligible ionic resistance to the overall cell, allowing the cell to function unimpeded. In embodiments, the membrane may be a composite polymer-gel electrolyte membrane made from a PVDF-HFP co-polymer, fumed silica ($SiO_2$), and multi-walled carbon nanotubes (CNTs). In some embodiments, the membrane may have a porosity achieved through a phase inversion casting method and subsequent extraction of dibutyl phthalate (DBP) with diethyl ether. Various weight loadings of CNTs from about 0 wt % up to about 40 wt % (wt % of CNTs to PVDF-HFP:$SiO_2$) may be dispersed in acetone by ultra-sonication. The conductivity of the film may be affected by changing the weight loading of CNTs in the membrane—the higher the loading of CNTS, the more conductive the film. Then 100-200 g/L of a 3:2 PVDF-HFP:

SiO$_2$ powder and 0.2 g/L DBP may be added to the acetone/CNTs dispersion. The solution may be vigorously mixed until the polymer is fully dissolved and the CNTs are fully incorporated into the membrane.

In embodiments, for thicker freestanding membranes, a thin film coating blade set to a channel height of about 500 μm may be used to cast a sheet of the composite on a glass surface. Acetone may be evaporated out of the film, allowing a film to be easily removable from the glass surface. The film may then be rinsed in ether to extract the DPB from the pores of the membrane. The film may be about 55 μm. This "dry" film can be cut into any shape required by the configuration of the cell. Optical images of various weight loadings and SEM images of about 0 wt % and about 5 wt % films are illustrated in FIG. 2 as well as the conductivity of the membrane as a function of CNTs weight loading.

FIG. 2 illustrates the structure of the PVDF-HFP:CNTs membrane after DBP is extracted, in accordance with various embodiments of the present disclosure. The porous structure is depicted in both the about 0 wt % and the about 5 wt % images. In embodiments, higher loadings of CNTs may result in a "fuzzy" membrane structure as the CNTs take a more dominant role in determining morphology (not shown here). The ionic conductivity may be comparable to existing separator membranes. The electronic conductivity and the resistance value may be affected by modifying the weight loading of CNTs in the membrane and the geometry of the membrane.

In an example, dry membranes were placed between two stainless steel electrodes in a swagelok where a potential was applied between the electrodes. The resulting current was measured, and values were converted to conductivity values after verifying thicknesses using SEM. A percolation limit may be reached below a certain loading and the membrane may fail to depict any enhanced conductivity from the CNTs—about 1 wt % in this case. This value was used to derive a power-law relation between conductivity and weight loading, which may be overlaid on results. This relation gives the ability to design membrane resistance to match the capacity of the cell.

The power-law relation is defined by the equation:

$$\sigma = \sigma_0 (V_f - V_c)^s$$

where σ is the electrical conductivity of the membrane, $\sigma_0$ is the electrical conductivity of the filler, $V_f$ is the filler volume fraction, $V_c$ is the percolation threshold, and S is a conductivity exponent.

The cell configuration illustrated in FIG. 3 allows for "static" testing of how the membrane effects self-discharge of a cathode material. As illustrated, LFP:SuperP carbon:PVDF (8:1:1) may be casted onto a stainless steel mesh and placed in a cell between two Li||Li electrodes, separated from both by about 0 wt % membranes. The LFP may be charged against one of the Li to simulate a fully charged battery. Li may be galvanostatically stripped from the top Li electrode and deposited on the surface of the bottom Li electrode at 2 mA/cm$^2$ to grow dendrites without consuming the charge capacity of the LFP. By monitoring the OCP of the LFP, self-discharge behavior can be seen. When a membrane with proper resistance intercepts the dendrite (e.g., about 5 wt %) a clear discharge plateau of LFP may appear in the OCP and remain over a significant period of time (e.g., greater than about 2 hrs). When comparing about 0 wt % to about 0.5 wt %, neither of which contribute additional resistance to the short circuit, the about 5 wt % membrane may significantly decrease the rate at which the LFP self-discharges upon shorting.

FIG. 4 illustrates testing of free standing membranes in two-electrode coincells using NMC||Li metal and relevant carbonate-based electrolyte (LP30), in accordance with various embodiments of the present disclosure. Cells were cycled at 2 mA/cm$^2$ until the cell internally short circuited from Li dendrite growth and separator penetration. As illustrated, the about 0 wt % and the about 0.5 wt % depict a sharp fall in cell potential at the moment of shorting. The about 5 wt % cell may not depict a sharp drop in potential and may gradually requires more charge capacity to fully charge the cell. This may be attributed to a slow bleed of charge capacity across the membrane and the dendrite, as described above. The cell may also continue to function even after the initial shorting incident and retains significant discharge capacity. It is likely the dendrite continues to grow after each subsequent charge, resulting in a gradually increasing $I_{SC}$ and self-discharge rate. This may provide more time to detect a failed battery and replace it before any failure occurs.

Figure 7:
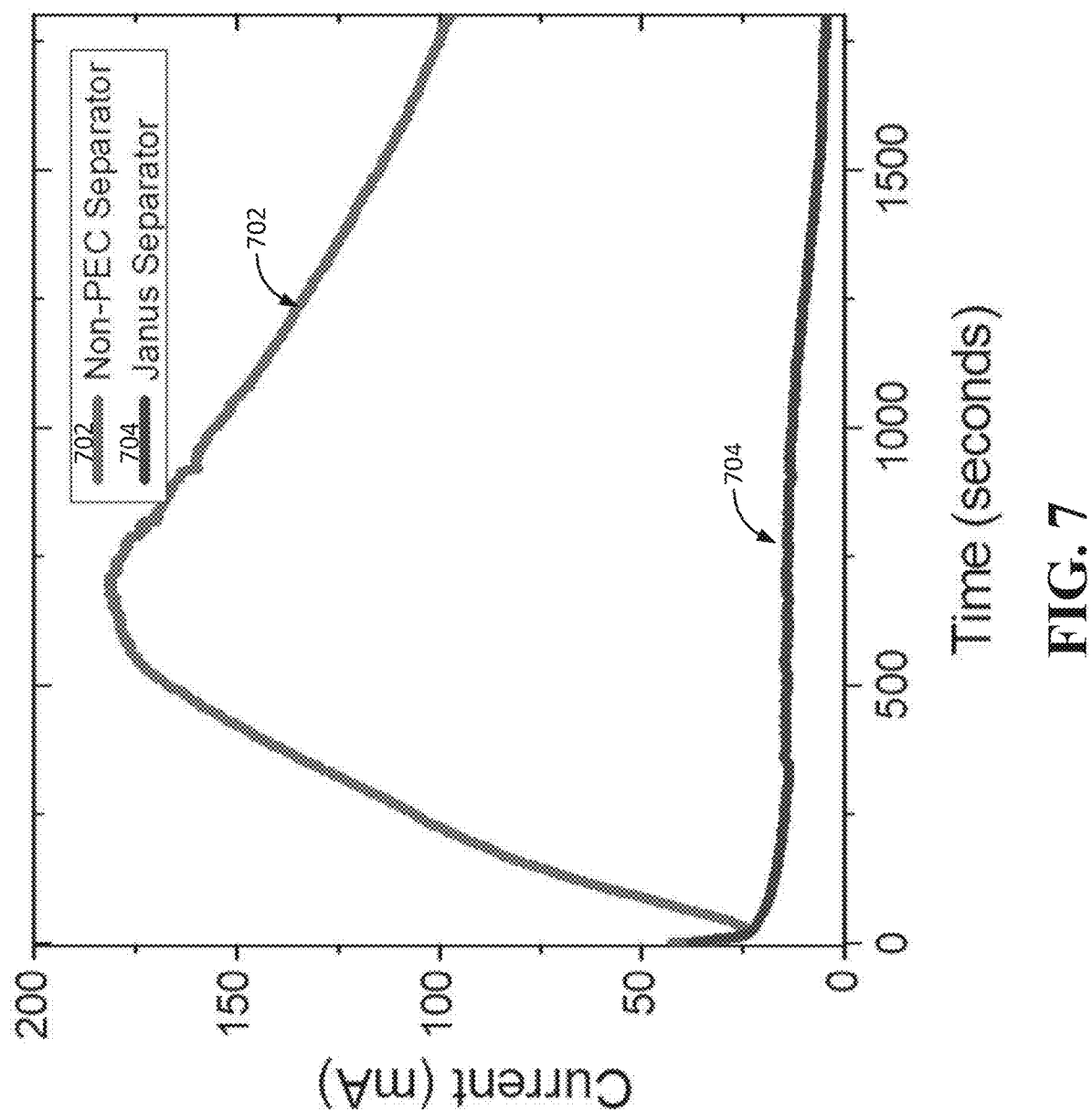
FIG. 7 illustrates a graph of current as a function of time comparing a single layer separator and a bilayer separator, in accordance with various embodiments of the present disclosure.

FIG. 7 illustrates a graph of current as a function of time comparing a single layer separator and a bilayer separator, in accordance with various embodiments of the present disclosure. The testing shows abuse testing of Li metal/NMC432 coin cells bilayer separator and a non-physically electrically conductive (PEC) separator. In this example, the bilayer separator may have about 5 wt % CNTs on a 0 wt % CNTs PVDF-HFP composite. The testing may include applying a 4.5 V potentiostatic hold to the coin cell to rapidly charge the cells, which results in dendrite growth on the anode. Internal short circuiting behavior was observed within the first minute of charging. Line 702, corresponding to the single layer separator, shows that the current shoots up to about 175 mA within about 750 seconds and then drops down to about 100 mA at about 1800 seconds. On the other hand, line 704, corresponding to the bilayer separator, depicts negligible current change.

Figure 8:
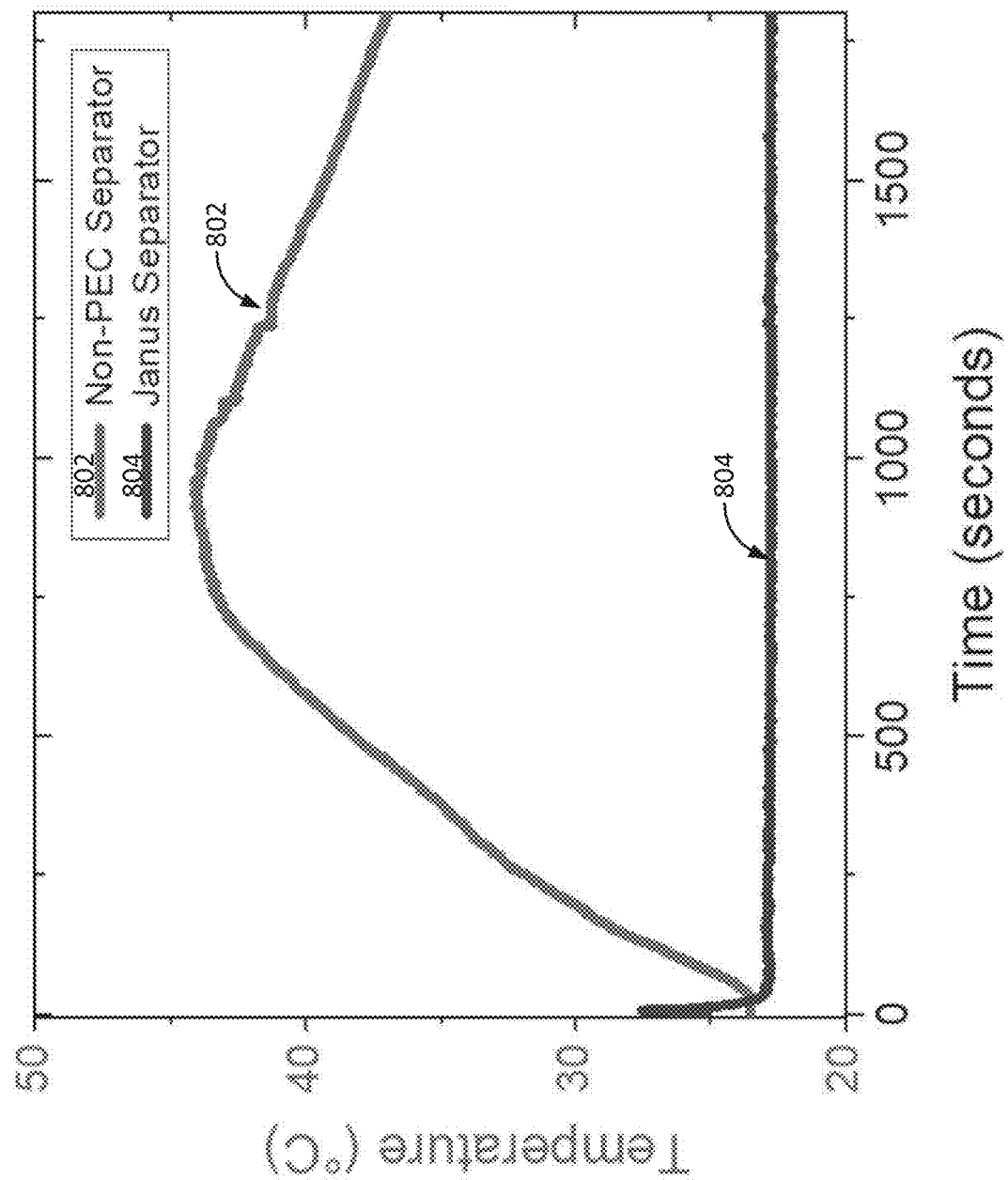
FIG. 8 illustrates a graph of temperature as a function of time comparing a single layer separator and a bilayer separator, in accordance with various embodiments of the present disclosure.

FIG. 8 illustrates a graph of temperature as a function of time comparing a single layer separator and a bilayer separator, in accordance with various embodiments of the present disclosure. The testing described above in FIG. 7 is substantially similar to that applied here. As depicted, line 802, corresponding to the single layer separator, reaches about 45 degrees Celsius at around 1000 seconds and then slowly drops down to about 37 degrees Celsius at about 1800 seconds. On the other hand, line 804, corresponding to the bilayer separator, depicts negligible temperature change.

Figure 9:
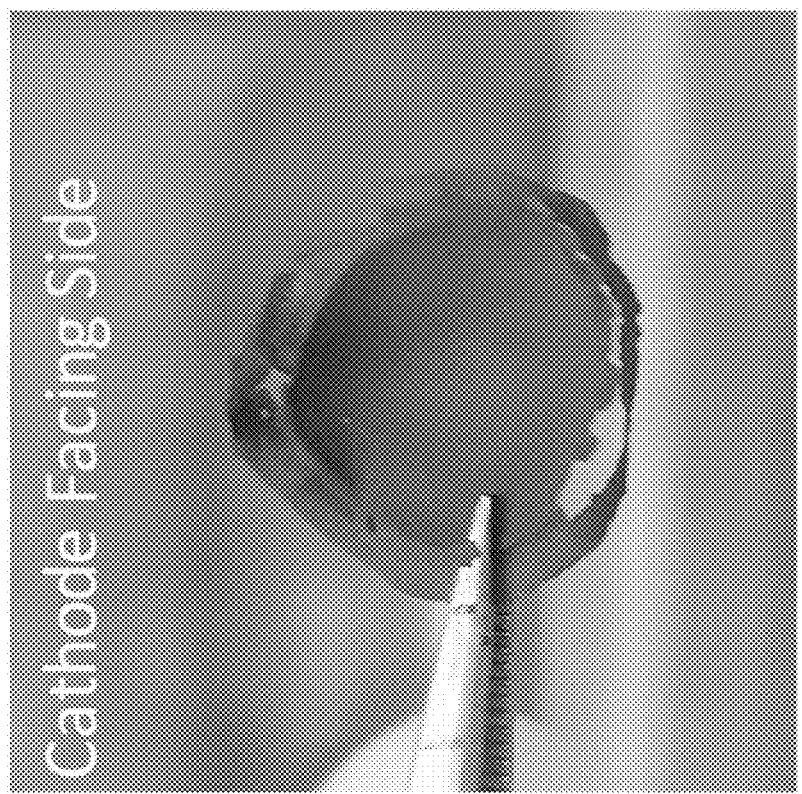
FIG. 9 illustrates a cathode facing side of a coin-cell-type battery bilayer separator after abuse testing, in accordance with various embodiments of the present disclosure.

FIG. 9 illustrates a cathode facing side of a coin-cell-type battery bilayer separator after abuse testing, in accordance with various embodiments of the present disclosure. The testing described above in FIG. 7 is substantially similar to that applied here. As depicted, the black cathode facing side is still mostly black, indicating that the dendrite has not penetrated the cathode facing side of the bilayer separator.

Figure 10:
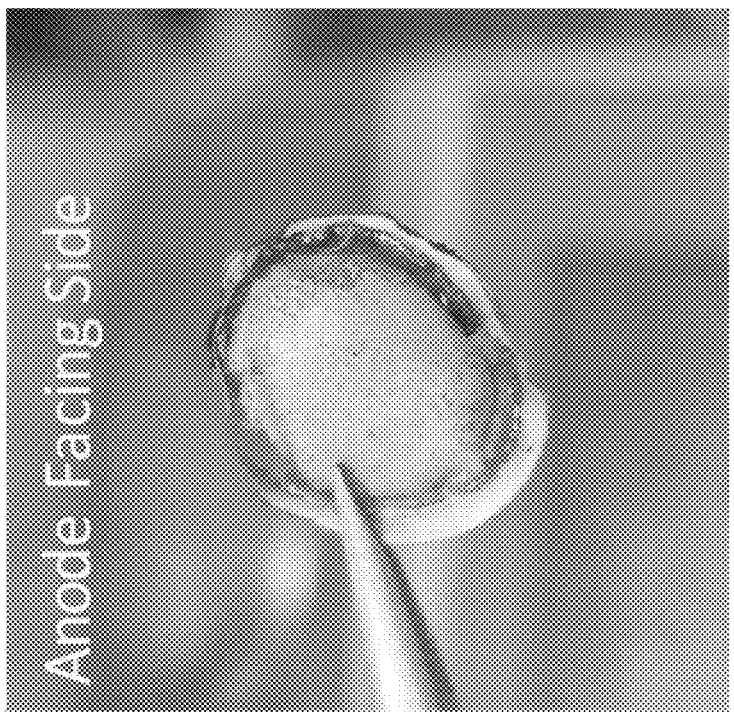
FIG. 10 illustrates an anode facing side of a coin-cell-type battery bilayer separator after abuse testing, in accordance with various embodiments of the present disclosure.

FIG. 10 illustrates an anode facing side of a coin-cell-type battery bilayer separator after abuse testing, in accordance with various embodiments of the present disclosure. The testing described above in FIG. 7 is substantially similar to that applied here. The anode facing side of the bilayer separator shows some abuse, and is merely illustrated to show the full effect of the abuse testing on the bilayer separator.

Figure 11:
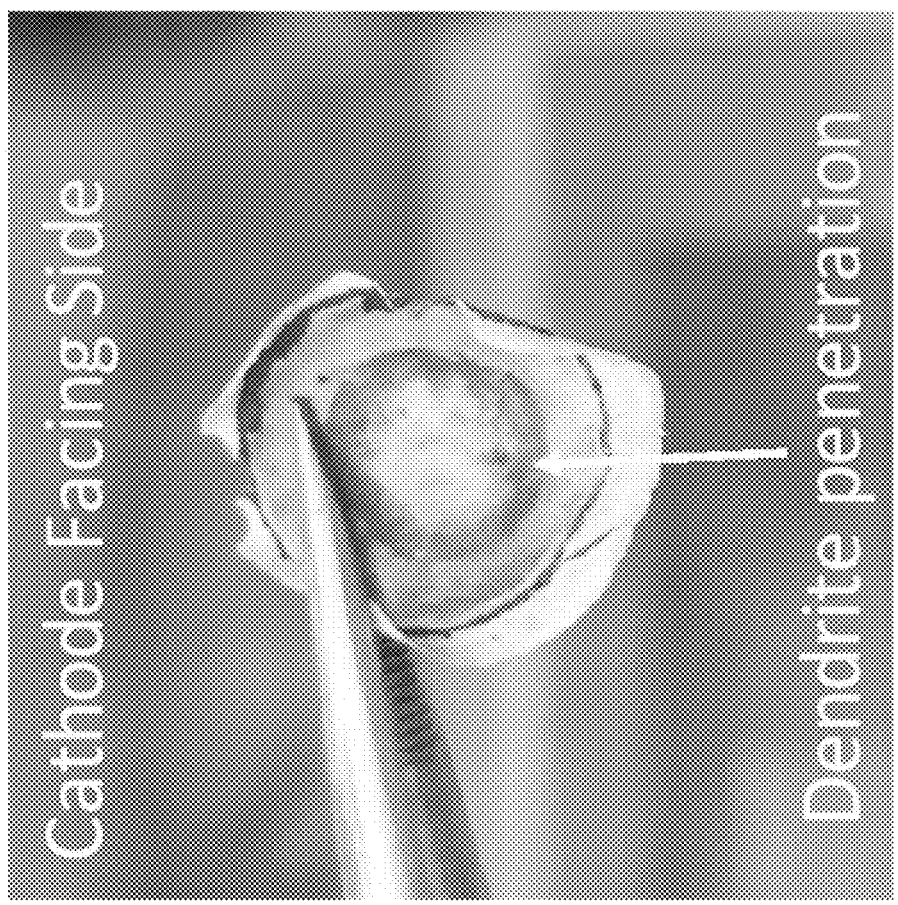
FIG. 11 illustrates a cathode facing side of a coin-cell-type battery separator after abuse testing.

FIG. 11 illustrates a cathode facing side of a coin-cell-type battery non PEC separator after abuse testing. The testing described above in FIG. 7 is substantially similar to that applied here. As depicted, the cathode facing side of the single layer separator is mostly silver, indicating that the dendrite growth has penetrated the cathode facing side of the single layer separator.

Figure 12:
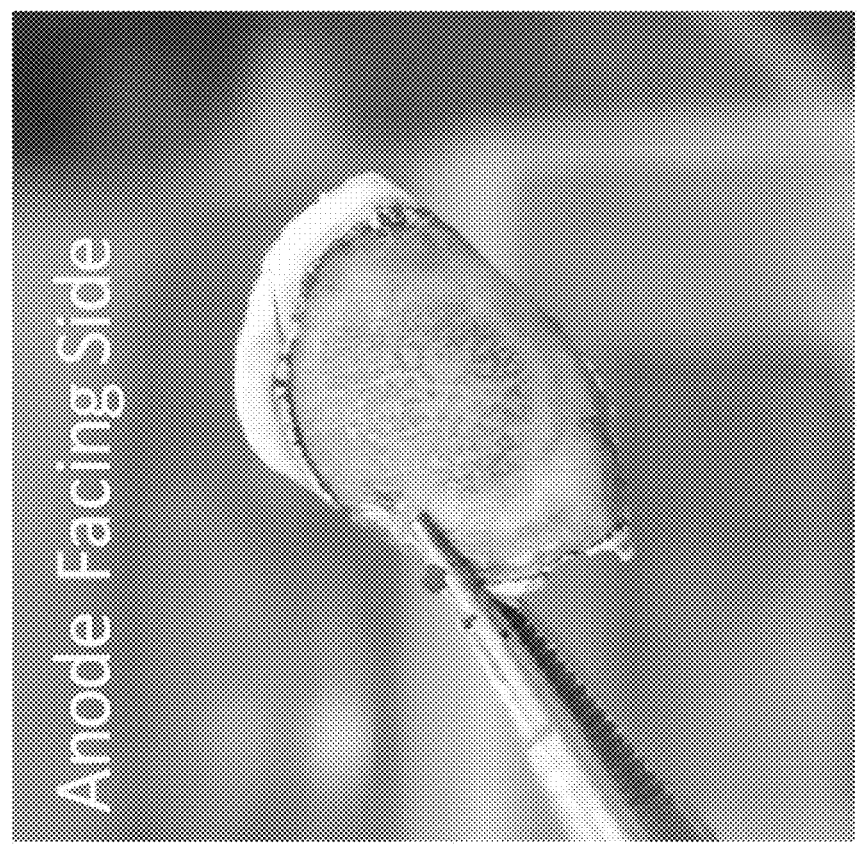
FIG. 12 illustrates an anode facing side of a coin-cell-type battery separator after abuse testing.

FIG. 12 illustrates an anode facing side of a coin-cell-type battery bilayer separator after abuse testing. The testing described above in FIG. 7 is substantially similar to that applied here. The anode facing side shows the signs of excess heat, curling the separator.

Figure 13:
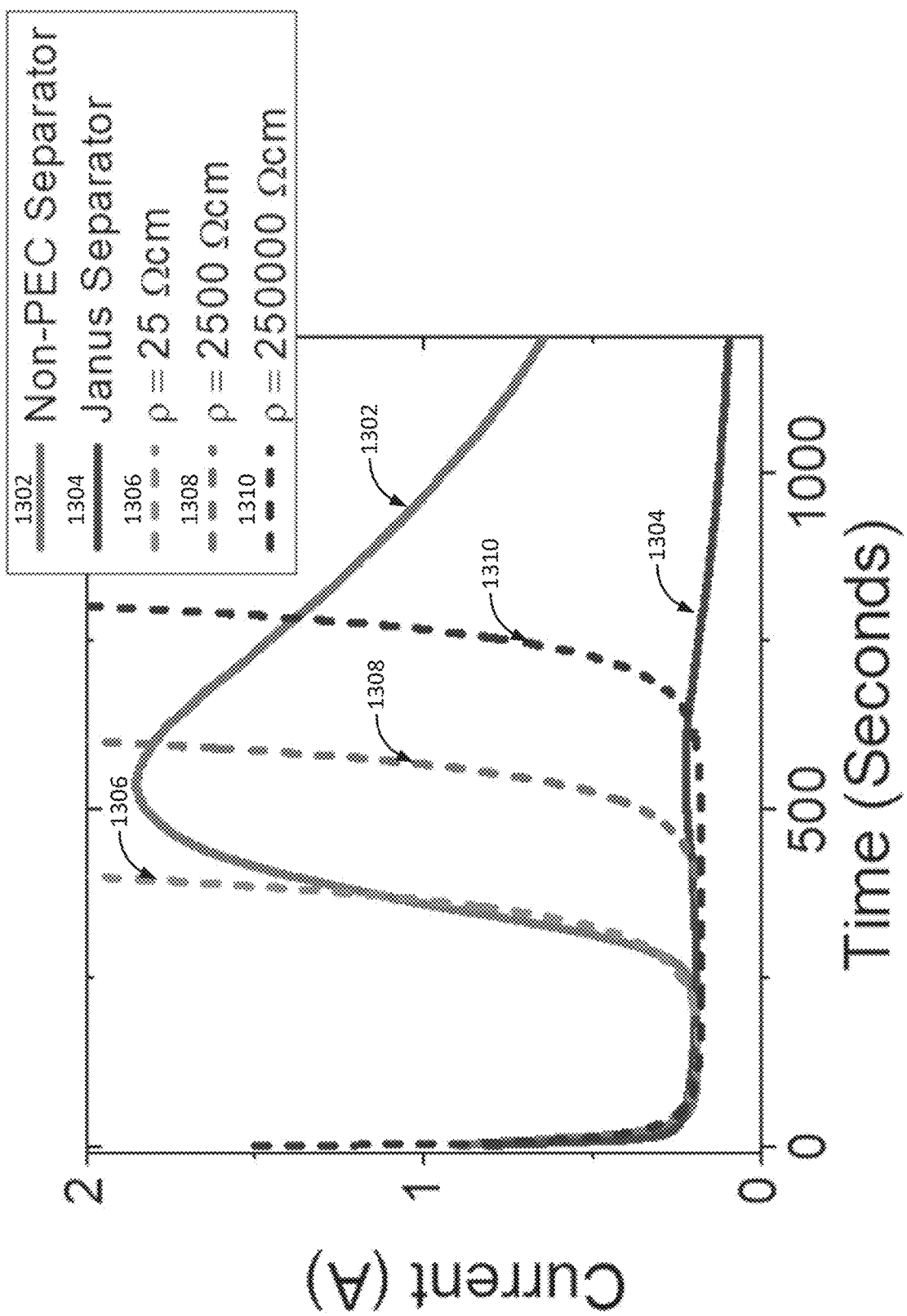
FIG. 13 illustrates a graph of current as a function of time comparing a single layer separator and a bilayer separator, in accordance with various embodiments of the present disclosure.

FIG. 13 illustrates a graph of current as a function of time comparing a single layer separator and a bilayer separator, in accordance with various embodiments of the present disclosure. The testing described above in FIG. 7 is substantially similar to that applied here. However, instead of a coin-cell-type battery, a large area format pouch cell is used (e.g., greater than about 30 cm$^2$). As illustrated, line 1302, corresponding to the single layer separator, sharply increases from about 250 seconds to about 500 seconds where it peaks at about 1.8 A. Line 1302 then drops to about 0.6 A at about 1250 seconds. Internal short circuiting behavior was observed here as well. In contrast, line 1304, corresponding to the bilayer separator, stayed at around 0.1 A to about 0.2 A with negligible drops and raises. Lines 1306, 1308, and 1310 illustrate a separator with different resistances and their theoretical effect on current. As illustrated, a higher resistance in the separator increases the time before a short circuit might occur.

Figure 14:
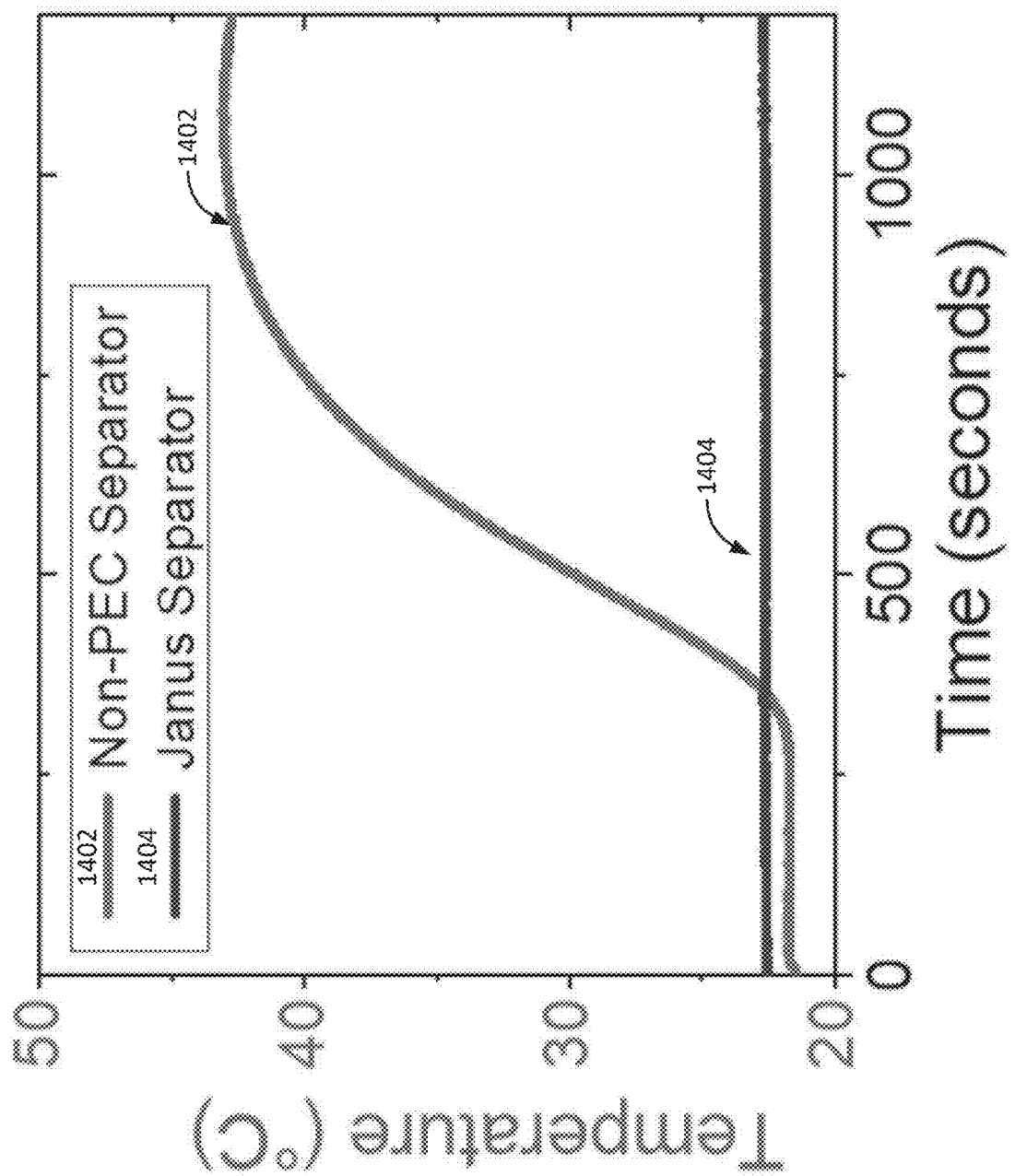
FIG. 14 illustrates a graph of temperature as a function of time comparing a single layer separator and a bilayer separator, in accordance with various embodiments of the present disclosure.

FIG. 14 illustrates a graph of temperature as a function of time comparing a single layer separator and a bilayer separator, in accordance with various embodiments of the present disclosure. The testing described above in FIG. 13 is substantially similar to that applied here. As depicted, line 1402, corresponding to the single layer separator, increases at about 300 seconds and reaches a peak at about 900 seconds at a temperature of about 43 degrees Celsius. The temperature remains somewhat constant until 1250 seconds. On the other hand, line 1404, corresponding to the bilayer separator, remain constant at about 23 degrees Celsius for the full abuse testing.

Figure 15:
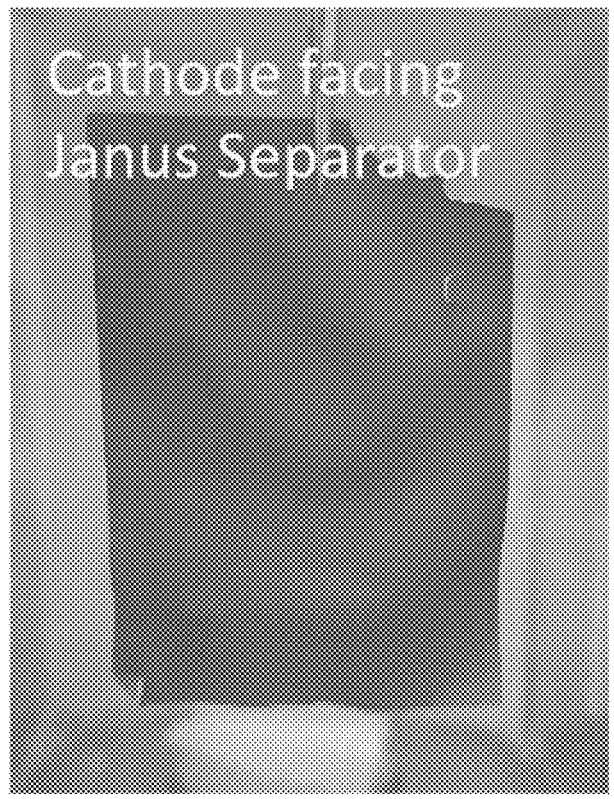
FIG. 15 illustrates a cathode facing side of a pouch-type battery bilayer separator after abuse testing, in accordance with various embodiments of the present disclosure.

FIG. 15 illustrates a cathode facing side of a pouch-type battery bilayer separator after abuse testing, in accordance with various embodiments of the present disclosure. The testing described above in FIG. 13 is substantially similar to that applied here. As illustrated, the cathode facing bilayer separator is mostly pristine and black indicating that the dendrite growth has not penetrated the PEC portion of the bilayer separator.

Figure 16:
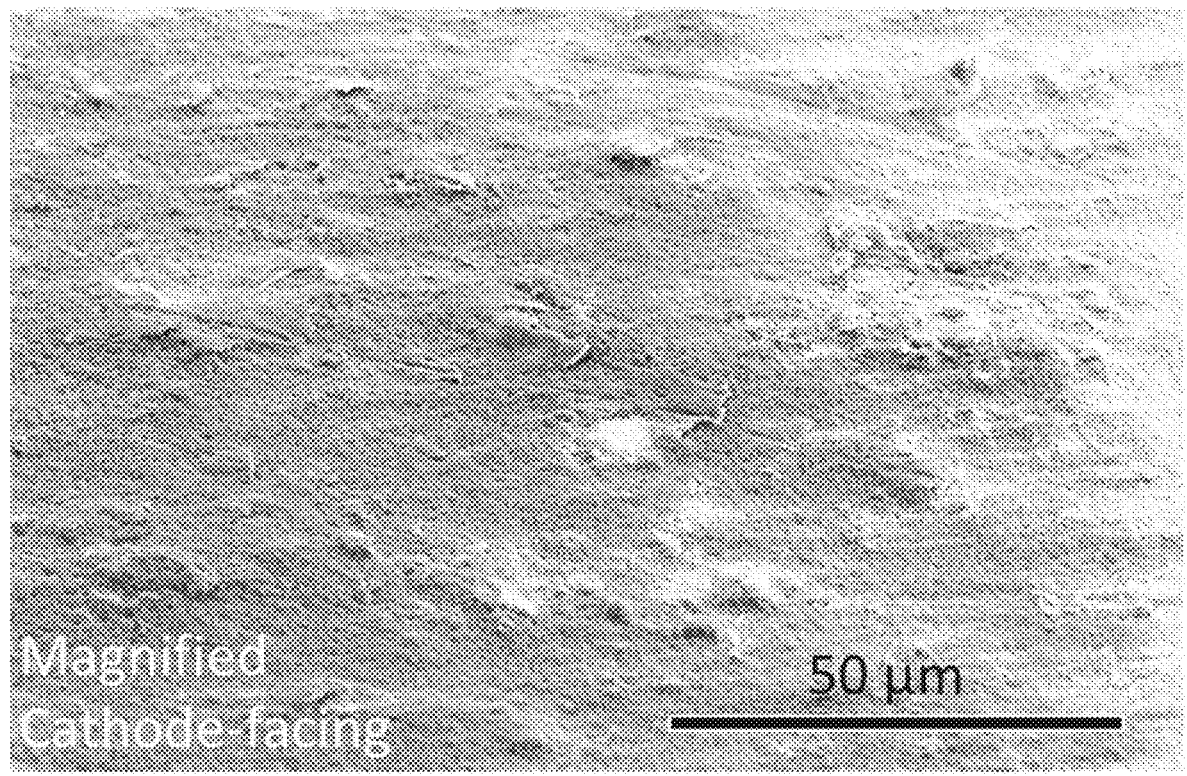
FIG. 16 illustrates a scanning electron microscope image magnifying the cathode facing side of a pouch-type battery bilayer separator after abuse testing, in accordance with various embodiments of the present disclosure.

FIG. 16 illustrates a scanning electron microscope image magnifying the cathode facing side of a pouch-type battery bilayer separator after abuse testing, in accordance with various embodiments of the present disclosure. The testing described above in FIG. 13 is substantially similar to that applied here. As illustrated, the surface of the cathode facing bilayer separator is still pristine and no dendrites have penetrated the surface.

Figure 17:
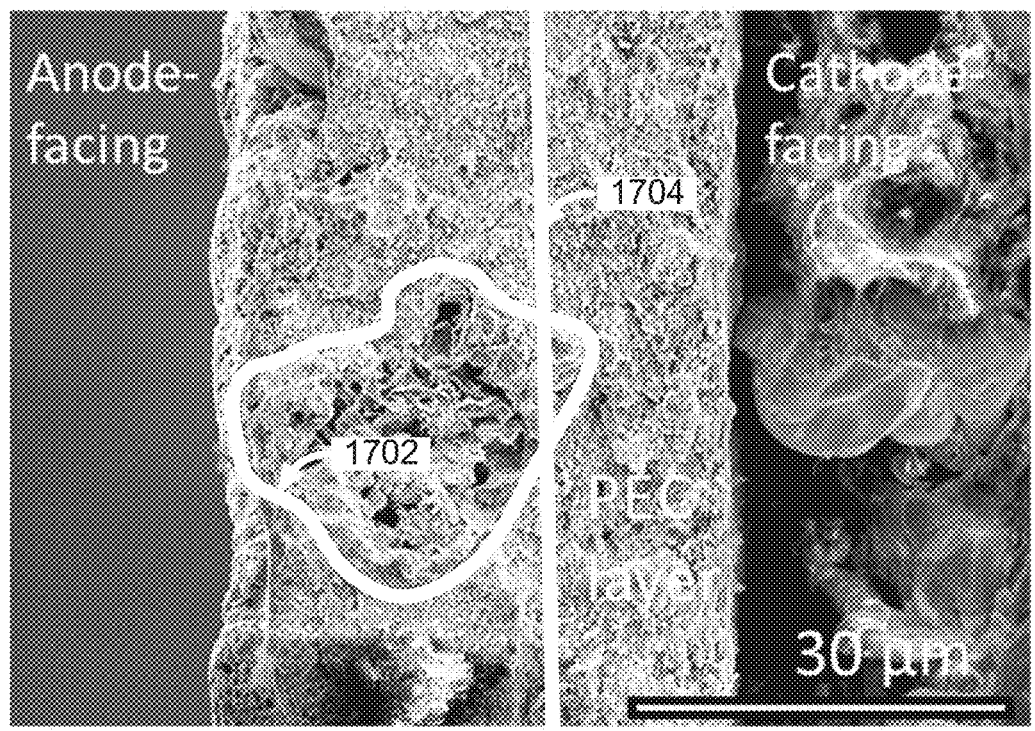
FIG. 17 illustrates a scanning electron microscope cross-section of a bilayer separator after abuse testing, in accordance with various embodiments of the present disclosure.

FIG. 17 illustrates a scanning electron microscope cross-section of a bilayer separator after abuse testing, in accordance with various embodiments of the present disclosure. The testing described above in FIG. 13 is substantially similar to that applied here. The cross-sectional view more clearly illustrates the dendritic growth 1702 stopping at about line 1704 where the PEC layer begins. This depicts that the PEC layer may mitigate or prevent the dendrites from penetrating through the bilayer membrane.

Figure 18:
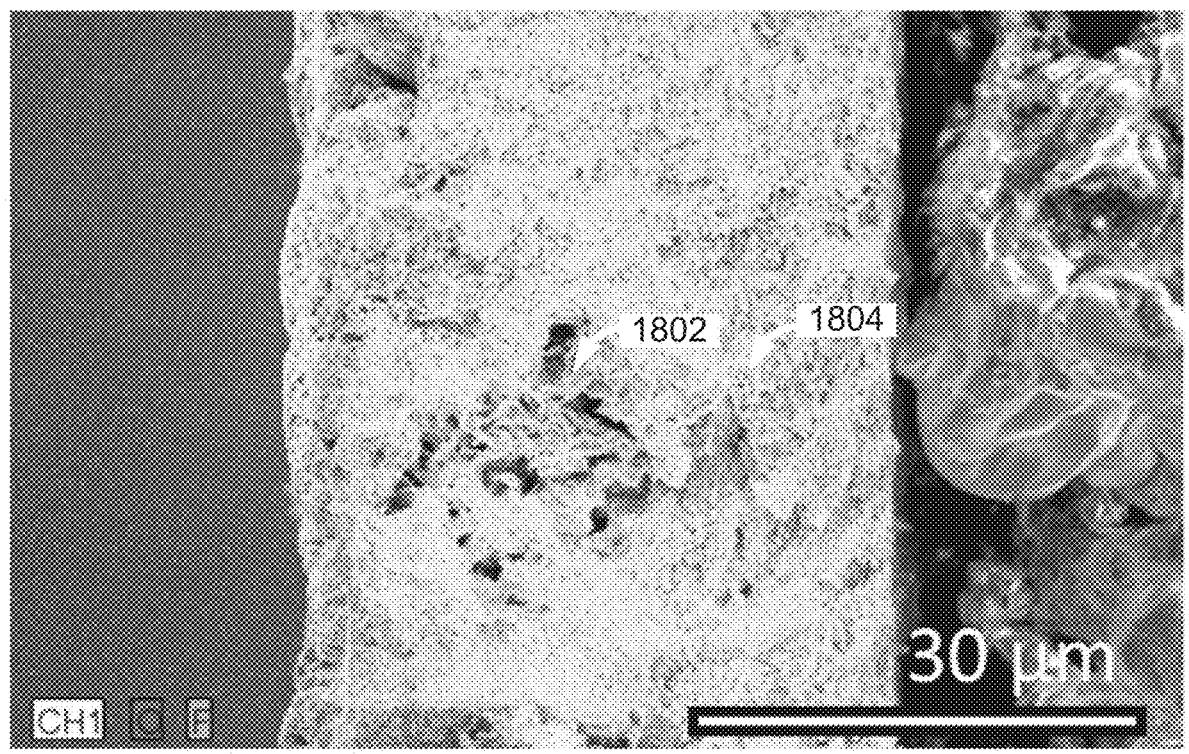
FIG. 18 illustrates an energy-dispersive X-ray spectroscopy cross section of a bilayer separator after abuse testing, in accordance with various embodiments of the present disclosure.

FIG. 18 illustrates an energy-dispersive X-ray spectroscopy (EDS) cross section of a bilayer separator after abuse testing, in accordance with various embodiments of the present disclosure. The testing described above in FIG. 13 is substantially similar to that applied here. The EDS helps illustrate the dendritic growth in 1802, corresponding to oxygen (O) that highlights lithium oxide of the dendrites, and the unaffected bilayer membrane in green, corresponding to fluorine (F) highlighting the polymer of the bilayer separator. Similar to FIG. 17, this depicts that the dendrite 1802 starts to grow from the left side and spread, but stops at the PEC layer 1804.

Figures 19, 20:
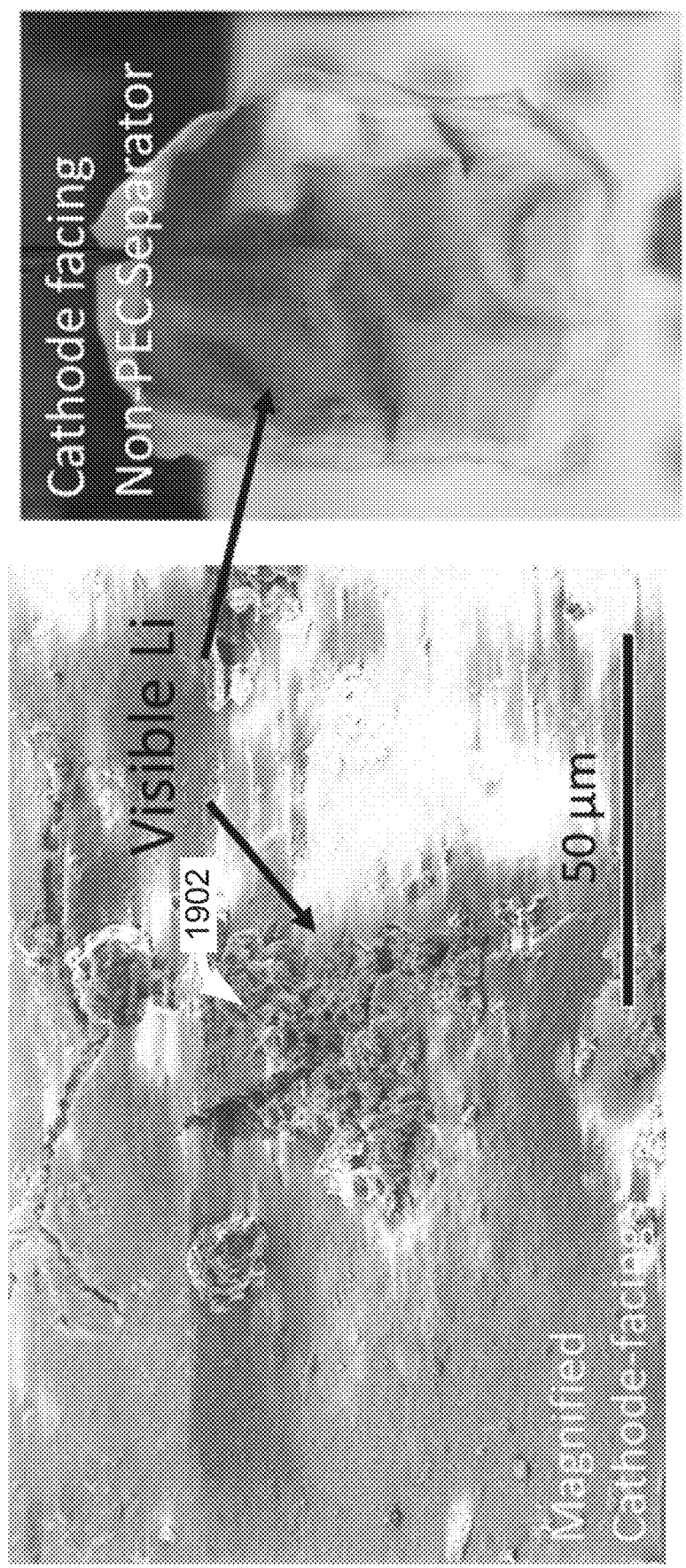
FIG. 19 illustrates a scanning electron microscope image magnifying the cathode facing side of a pouch-type battery separator after abuse testing.
FIG. 20 illustrates a cathode facing side of a pouch-type battery separator after abuse testing.

FIG. 19 illustrates a scanning electron microscope image magnifying the cathode facing side of a pouch-type battery separator after abuse testing. The testing described above in FIG. 13 is substantially similar to that applied here. As depicted, dendritic growth has penetrated through the separator and is visible as little cloud-like formations 1902 on the magnified surface of the cathode facing separator.

FIG. 20 illustrates a cathode facing side of a pouch-type battery separator after abuse testing. The testing described above in FIG. 13 is substantially similar to that applied here. As depicted, the cathode facing portion of the single layer separator is gray, not the pristine black it is originally. The gray indicates that the dendrites have penetrated through the single layer separator.

Figure 21:
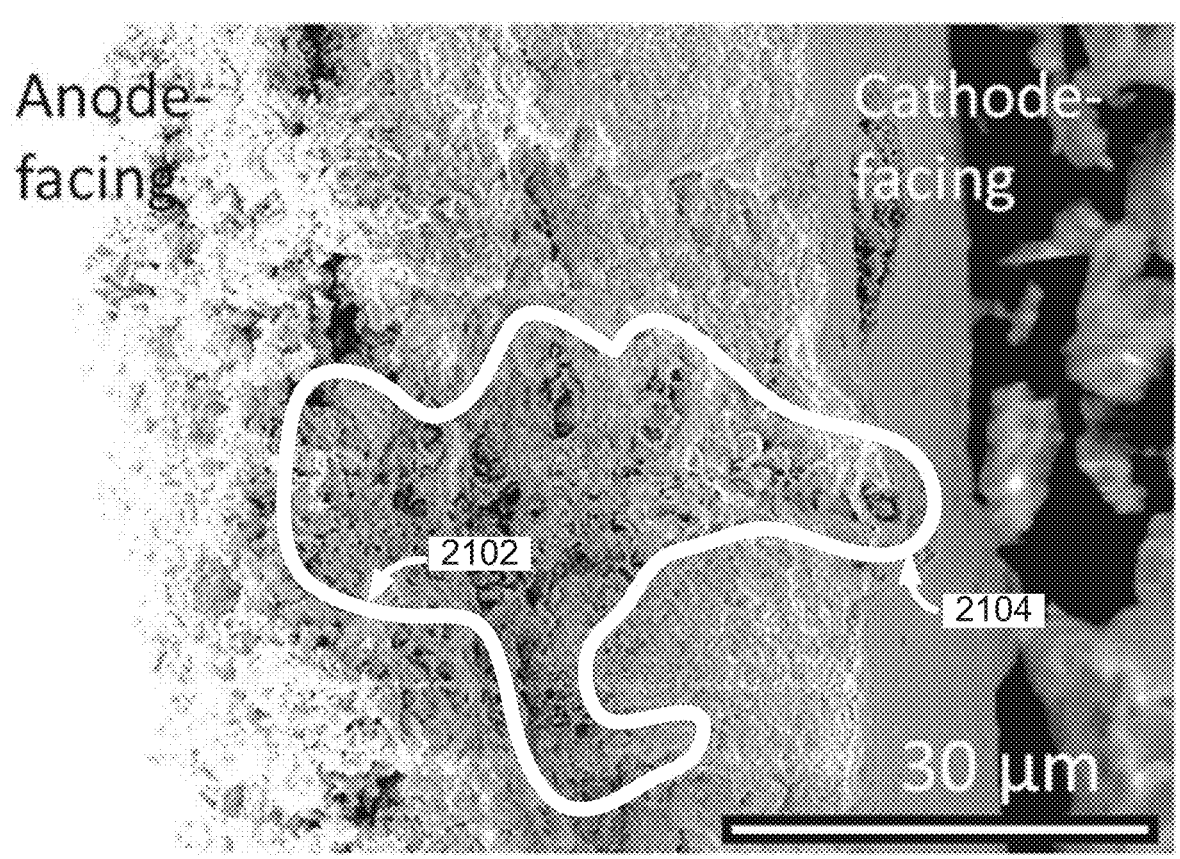
FIG. 21 illustrates scanning electron microscope cross-section of a separator after abuse testing.

FIG. 21 illustrates scanning electron microscope cross-section of a separator after abuse testing, in accordance with various embodiments of the present disclosure. The testing described above in FIG. 13 is substantially similar to that applied here. The cross section illustrates the dendritic growth 2102 penetrating through from the anode facing side of the single layer separator to the cathode facing side of the single layer separator. The surface of the cathode facing side is bulging from the dendritic growth at 2104.

Figure 22:
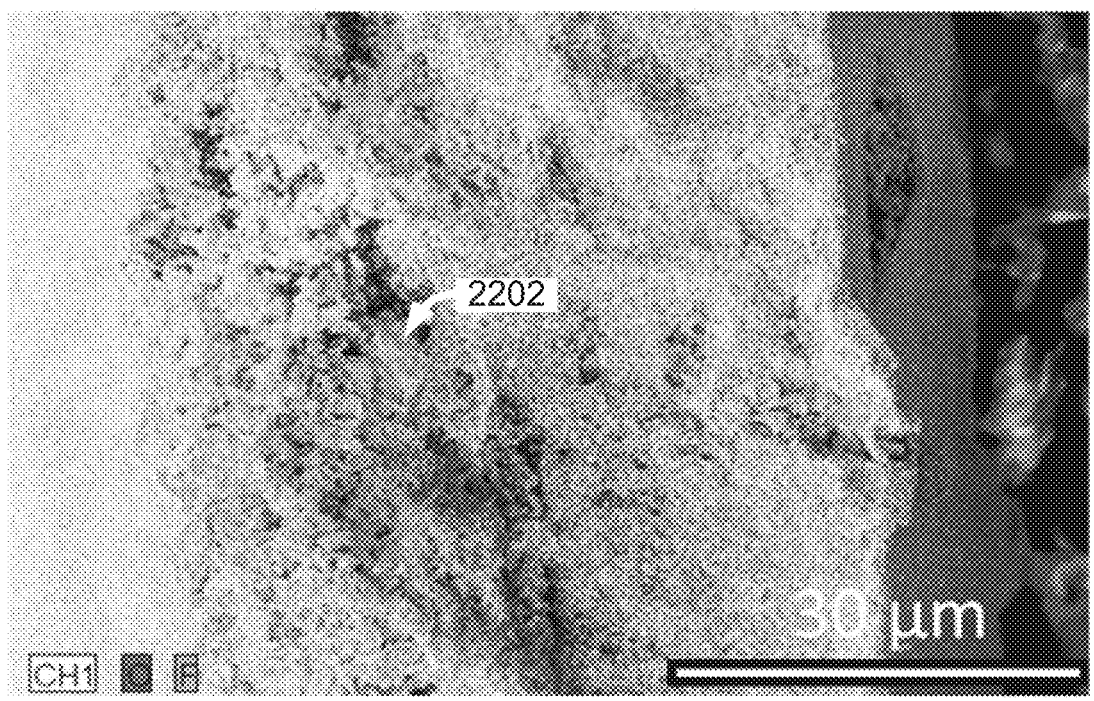
FIG. 22 illustrates an energy-dispersive X-ray spectroscopy cross section of a separator after abuse testing.

FIG. 22 illustrates an energy-dispersive X-ray spectroscopy cross section of a separator after abuse testing, in accordance with various embodiments of the present disclosure. The testing described above in FIG. 13 is substantially similar to that applied here. The EDS helps illustrate the dendritic growth in red, corresponding to O, and the unaffected bilayer membrane in green, corresponding to F. Similar to FIG. 21, this depicts that the dendrite 2202 has fully invaded the anode facing side of the single layer separator and has cut through the cathode-facing side of the single layer separator. As such, the separator has failed to prevent the dendrite from penetrating the separator. Further depicted is the membrane used as a bilayer separator coated directly on a fully insulating separator (FIG. 5) and also as a direct coating on the active cathode material (FIG. 6). Referring to FIG. 5, about 0 wt % mixture may be casted onto glass with a channel height of about 100 μm and the acetone is evaporated. A mixture containing CNTs (about 3 wt % in the membrane illustrated in FIG. 5) may be casted with a channel height of about 50 μm directly on top of the dry about 0 wt % film. The two layers may merge together and contact as the acetone from the CNTs mixture redissolves on top of the dry about 0 wt % layer. This bilayer membrane may be rinsed in ether to extract the DBP. The final "dry" membrane may be less than about 20 μm thick with about a 0 wt % layer thickness of about 11 μm and a CNT layer thickness of about 7.5 μm. The bilayer membrane may behave similarly to the freestanding electrode and may slow the rate of self-discharge after shorting has occurred despite being significantly thinner than the freestanding membrane.

Referring to FIG. 6, a cathode may be casted onto aluminum foil using ball milling and blade coating methods, in accordance with various embodiments of the present disclosure. A mixture containing CNTs is casted directly over top of the dry cathode with a channel height about 100

μm above the top surface of the cathode. Once all the acetone has evaporated off the entire coated cathode is rinsed in ether. The ether rinse does not affect the performance of the cathode.

As described above, the addition of the membrane can significantly improve safety upon shorting and allow detection of such event without failure. The improved safety in energy storage devices, such as, for example, high energy density and large capacity batteries, is appropriate for various applications, including long range electric vehicles, where high capacity batteries are often required to deliver a range equivalent to traditional fossil fuel powered vehicle; stationary smart grid energy storage, where battery capacities may be required to reach very large values to meet the demand of generated power; smart portable device that often have very thin separators to decrease non-active mass and are in close proximity to the users; among varied other applications.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It will be apparent to one of skill in the art how alternative functional, logical or physical partitioning and configurations can be implemented to implement the desired features of the technology disclosed herein. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What will be claimed is:

1. A battery comprising:
an anode;
a cathode;
a separator between the anode and the cathode; and
a membrane coupled to the separator, the membrane comprising a mixed electronic conductor and ionic conductor with an electronic resistance between 10 ohms/cm$^2$ and 1 megaohm/cm$^2$ to slow a rate of discharge for the battery when shorted, wherein:
the membrane comprises a carbon-based material and a porous polymer gel electrolyte;
a weight percentage of the carbon-based material in the membrane is between 2% and 10%; and
ionic conductivity of the membrane is between $1 \times 10^{-7}$ S/cm and $1 \times 10^{-5}$ S/cm.

2. The battery of claim 1, wherein the anode comprises one or more of:
graphite;
silicon;
Li-metal;
Na-metal; or
Zn-metal.

3. The battery of claim 1, wherein the carbon-based material comprises a carbon nanotube.

4. The battery of claim 1, wherein the cathode comprises one or more of:
Li-rich layered oxides;
Ni layered oxides;
sulfur; or
oxygen.

5. The battery of claim 1, wherein the anode comprises one or more of:
carbon;
silicon, or
pure-metal.

6. The battery of claim 1, wherein the membrane comprises a composite polymer-gel electrolyte membrane, wherein the composite polymer-gel electrolyte membrane comprises a PVDF-HFP co-polymer, fumed silica (SiO$_2$), and multi-walled carbon nanotubes (CNTs).

7. A method comprising:
casting a membrane onto a surface;
dispersing carbon nanotubes in acetone via ultra-sonication to form a dispersion;
adding a powder and dibutyl phthalate to the dispersion to form a polymer; and
mixing the polymer until dissolved and the carbon nanotubes are incorporated into the membrane.

8. The method of claim 7, wherein the casting is implemented by phase inversion.

9. The method of claim 7, wherein the dispersion comprises acetone and carbon nanotubes.

10. The method of claim 7, wherein the powder comprises a 3:2 PVDF-HFP:$SiO_2$ powder.

11. The method of claim 7, further comprising disposing the membrane onto a separator between an anode and a cathode.

12. A method comprising:
 casting a film onto a surface;
 evaporating the acetone from the film to form a dry film;
 casting a mixture onto the dry film to merge the dry film and the mixture together to form a bilayer membrane.

13. The method of claim 12, wherein the mixture comprises carbon nanotubes (CNTs) and acetone.

14. The method of claim 13, wherein the CNTs are about three weight percent of the mixture.

15. The method of claim 12, further comprising rinsing the bilayer membrane in ether to extract dibutyl phthalate.

16. The method of claim 12, further comprising disposing the bilayer membrane onto a separator between an anode and a cathode thereby creating a battery.

17. The battery of claim 1, wherein the carbon-based material comprises at least one of:
 carbon nanotubes;
 carbon blacks;
 carbon fibers; or
 graphite particles.

18. The battery of claim 1, wherein the porous polymer gel electrolyte comprises a PVDF-HFP co-polymer and the membrane further comprises fumed silica ($SiO_2$).

* * * * *